United States Patent [19]
O'Brien

[11] Patent Number: 5,386,960
[45] Date of Patent: Feb. 7, 1995

[54] TEMPORARY HOLDER FOR LICENSE TAGS AND OTHER PLATES

[76] Inventor: Shaughn F. O'Brien, 202 Lady Susan Ct., Casselberry, Fla. 32707

[21] Appl. No.: 952,569

[22] Filed: Sep. 28, 1992

[51] Int. Cl.6 ............................................. F16B 47/00
[52] U.S. Cl. ............................. 248/205.5; 248/206.3; 248/684; 40/593
[58] Field of Search ............... 248/205.5, 206.1–206.4, 248/684, 363, 467, 302, 489, 322, 205.6–205.9; 40/200, 593, 597, 910

[56] References Cited

U.S. PATENT DOCUMENTS

| 968,068 | 8/1910 | McClelland, Jr. | 248/205.5 |
|---|---|---|---|
| 1,014,471 | 1/1912 | Herold | 248/230 |
| 1,483,640 | 2/1924 | Manning | 248/206.3 |
| 1,587,144 | 6/1926 | Burk | 248/205.5 |
| 1,645,229 | 10/1927 | Churmusi | 248/206.3 X |
| 1,683,645 | 9/1928 | Abbey . | |
| 1,840,763 | 1/1932 | Benchley | 248/206.3 |
| 1,898,781 | 2/1933 | Leiter | 248/302 X |
| 1,922,900 | 8/1933 | Plante | 40/597 X |
| 1,953,877 | 4/1934 | Chase | 248/205.5 |
| 2,069,942 | 2/1937 | Cohen | 40/597 X |
| 2,143,608 | 1/1939 | Morris | 20/40.5 |
| 2,706,659 | 4/1955 | Landis | 248/205.5 X |
| 3,305,202 | 2/1967 | Christenson | 248/467 |
| 3,531,880 | 10/1970 | Ramee | 40/593 X |
| 3,660,861 | 5/1972 | Delmonico | 248/683 X |
| 4,471,873 | 9/1984 | Thomas | 248/205.5 X |
| 5,078,356 | 1/1992 | Adams | 248/206 |
| 5,141,191 | 8/1992 | Coffield | 248/206.3 |

FOREIGN PATENT DOCUMENTS 768815 2/1957 United Kingdom .

*Primary Examiner*—Karen J. Chotkowski
*Attorney, Agent, or Firm*—Edward M. Livingston

[57] ABSTRACT

A holder for temporary and secure attachment of license tags (2) and personalized plates (12) to a vehicle, particularly an automobile (1), a window or other surface using one or more suction cups (7 or 9a and 9b) with a holding wire (5) attached through the necks (7) of the suction cups. Each end of the holding wire (5) has connecting components to attach the wire to the plates. This holding device allows dealer tags and plates to be attached to the inside rear window (4) of an automobile, thereby avoiding damage, loss or theft which results from securing the tags to a vehicle by magnets. In addition to holding license plates, this holder enables one to display personalized or novelty plates and change such plates easily and quickly as desired, thereby providing a medium for advertising, expression or communication to supplement or in lieu of using bumper stickers or other such items.

12 Claims, 1 Drawing Sheet

TEMPORARY HOLDER FOR LICENSE TAGS AND OTHER PLATES

BACKGROUND OF THE INVENTION

This invention relates to tag-and plate holders and more particularly to a temporary holder for license tags, such those commonly used by dealers as well as for personalized advertising and novelty plates.

Currently, temporary license tags, such as dealer plates, are attached to automobiles by magnets. Magnets often scratch the paint of the automobiles, requiring a paint touch-up before that automobile can be sold. A further problem with the current magnetized holder is that such dealer plates often fall off the vehicle or are easily stolen. In addition, magnets cannot secure plates to fiberglass which is a material used often in sports cars and even many other cars due to its being lighter weight than metal.

In an effort to avoid the above problems, such as damage to paint, loss, theft and non-attachment to fiberglass cars, many dealers and people place their license plate inside the rear car window. However, when placed in the rear car window the plate must be jammed. into the lining at the bottom of the rear window, resulting in damage to the lining. Also, the messy black sealer used in the liner gets on the plate and the window as well as on a person's hands, thereby requiring: additional cleaning.

Thus, a great need exists for a holder for temporary license tags and other plates that eliminates the above problems.

In addition to displaying temporary license tags and plates, many persons like to display personalized and novelty plates in automobiles windows or from a window of a building as a form of expression in lieu of bumper plates. Thus, a need also calls for a device such as the present invention.

The prior art is devoid of plate holders similar to the present invention, the closest patented art being the following:

| Patent No. | Inventor | Date of Patent |
| --- | --- | --- |
| U.S Pat. No. 5,078,356 | Adams | Jan. 7, 1992 |
| U.S Pat. No. 968,068 | McClelland, Jr. | Aug. 23, 1910 |
| U.S Pat. No. 2,143,608 | Morris | Jan. 10, 1939 |
| GB 768,815 | | Feb 20, 1957 |
| U.S Pat. No. 1,645,229 | Churmusi | Oct. 11, 1927 |
| U.S Pat. No. 1,683,645 | Abbey | Sept. 11, 1928 |
| U.S Pat. No. 1,840,763 | Benchley | Jan. 12, 1932 |

The Adams patent teaches a suction cup with an offset hook for hanging items from a vertical surface. The McClelland, Jr. patent teaches a suction-like device for holding mirrors to surfaces. The Morris patent shows a frame being held by suction cups. The Great Britain patent teaches a suction cup device for holding licenses. The Churmusi, Abbey and Benchley patents all show license holders which utilize suction cups. Although many holding devices do use suction cups, none has the same structure as the present invention for holding dealer license tags and other plates.

The objects and advantages of the present invention over the prior art are set forth in the following summary.

SUMMARY OF THE INVENTION

The primary object of the present invention is to provide a holding device for temporary attachment of license tags and plates to automobiles and other vehicles.

Another object of the present invention is to provide such a holding device that will not scratch or otherwise damage an automobile or vehicle on which it is placed.

A further object of the present invention is to provide such a holding device that helps to prevent the loss of temporary tags and plates caused by falling off the exterior of an automobile or vehicle.

An even further object of the present invention is to provide such a holding device that helps prevent theft of license tags or other plates.

An additional object of the present invention is to provide such a holding device that enables the tag or plate that is displayed on the holder to be changed quickly and easily as desired to display various other plates from a vehicle, a vehicle window or window of a building.

The present invention fulfills the above and other objects by providing a holder for temporary and secure attachment of license tags and plates to a vehicle which utilizes suction cups having necks through which a wire is passed. Each wire extends an equal distance on each side of the suction cup or cups and has a connecting end with means of connecting each end to a license tag or plate. The connecting end of each wire may comprise a hook and the means for connecting each end may comprise a bolt, washer and nut combination on each end of the wire. One or more suction cups may be used to mount the holding device in place, preferably on the inside of the rear window of the vehicle or automobile.

Other objects and advantages of the present invention will become more readily apparent when preferred embodiments of the device are described in conjunction with the following drawings.

BRIEF DESCRIPTION OF THE DRAWINGS

The drawings which accompany this patent application are used to illustrate the preferred embodiments are as follows.

DESCRIPTION OF THE PREFERRED EMBODIMENTS

Figure 1:
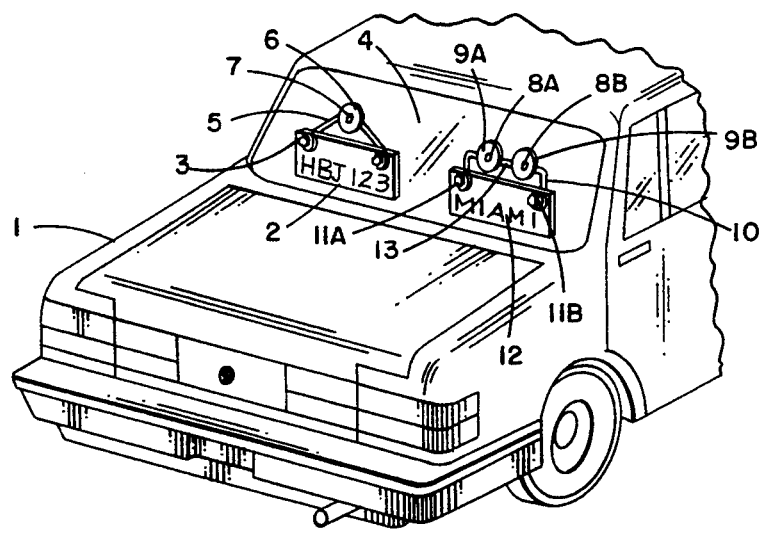
FIG. 1 is a perspective view of both single and double suction cup embodiments of the holding device in actual use mounted in the rear window of an automobile.

Referring to the drawings, in FIG. 1 an automobile 1 is shown with a license plate or tag 2 mounted in the rear window 4 using a single suction cup embodiment. Also, a personalized plate 12 is also mounted in the rear window 4 using a double suction cup embodiment. The single suction cup embodiment contains a suction cup 6 with a holding wire 5 running though the neck 7 of the suction cup 6. The wire 5 extends an equal distance beyond each side of the neck 7 so that the suction cup 6 is centrally located with respect to the license tag 2. The license tag 2 is then attached to each end of the wire 5 by a holding means which, as shown and described in other drawings and this specification, may comprise a nut, washer and bolt combination.

The personalized plate 12 is being held in the rear window 4 by two suction cups 9a and 9b each with necks 8a and 8b through which the wire 10 passes. Each wire is then connected to each end of the plate 12 by holding means 11a and 11b which, once again, may comprise a bolt, washer and nut combination for easy and quick removal or changing of the plate as desired.

Figure 2:
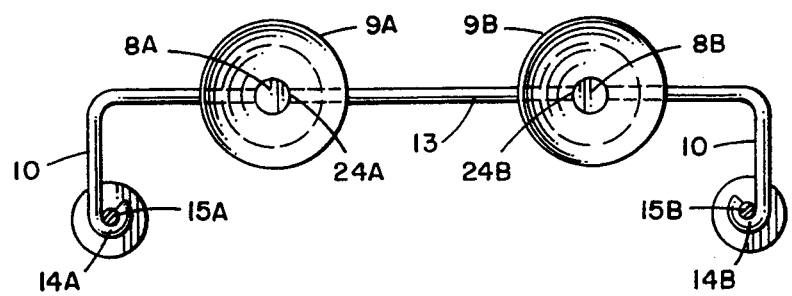
FIG. 2 is a front view of a double suction cup embodiment of the holding device by itself.

FIG. 2 show the double suction cup embodiment of the holding device by itself without a tag or plate having two suction cups 9a and 9b, each having necks 8a and 8b with holes 24a and 24b therethrough for insertion of the wire 13. The wire 13 would extend outward from each suction cup to vertical bends 10, down to loops 14a and 14b through which holding means 15a and 15b such as a bolt, nut and washer or combination thereof, would be utilized to secure the license tag or plate.

Figure 3:
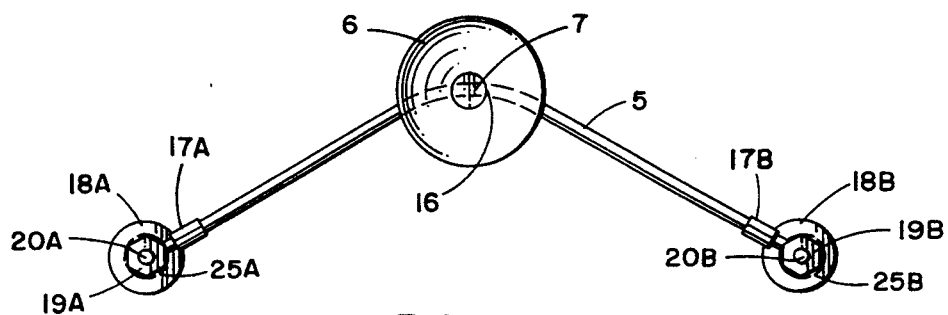
FIG. 3 is a front view of a single suction cup embodiment of the holding device by itself.

The single suction cup embodiment shown in FIG. 3 uses only one suction cup 6 with a neck 7, which also has a hole through the neck 16, through the wire 5 that extends an equal distance beyond the suction cup 6 to connectors 17a and 17b which secure the wire to holding means comprising of loops or bends 25a and 25b secured to the license tag or plate by bolts 20a and 20b, nuts 19a and 19b and washers 18a and 18b.

Figure 4:
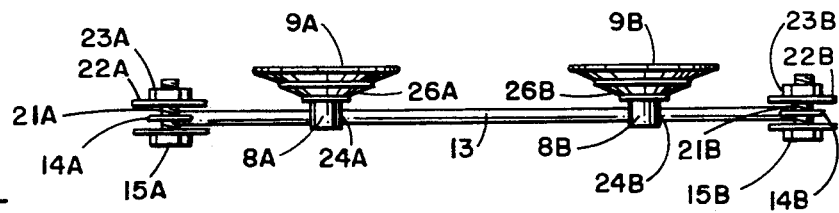
FIG. 4 is a top view of the double suction cup embodiment of the holding device by itself.

The final illustration in FIG. 4 shows the preferred double suction cup embodiment with two suction cups 9a and 9b having cup portions 26a and 26b, necks 8a and 8b and holes 24a and 24b through each neck 8a and 8b. The wire 13 passes through the holes 24a and 24b in each neck 8a and 8b and extends an equal distance beyond each suction cup 9a and 9b to ends having a securing loop or hook 14a and 14b through which is passed a bolt 15a and 15b of sufficient length 21a and 21b for a washer 22a and 22b and a nut 23a and 23b to be secured thereto when holding a plate.

The suction cups would be made preferably of a clear polyethylene plastic to provide for secure attachment to a window of an automobile. The wire securing the plate to the suction cups could be made of almost any rigid material, but preferably of plastic or metal wire enclosed in a plastic sheaf, or coated with an epoxy or vinyl.

As described in detail hereinabove, this novel invention provides a means for safely securing dealer license tags and personalized license plates to a vehicle without damage to either the exterior or interior of the vehicle or loss due to falling off or theft. Moreover, the present invention would enable a driver to attach various personalized advertising and novelty plates to the inside rear window and change them easily, quickly and as frequently as desired, perhaps eliminating the need for bumper stickers which can cause damage to the exterior of a vehicle. Furthermore, in addition to being used in conjunction with vehicles, this invention could also be used to attach and display a plate from a window of a building or almost any surface.

Although only a few embodiments of the present invention have been described in detail hereinabove, all improvements and modifications to this invention within the scope or equivalents of the claims are covered by this invention.

I claim:

1. A holder for temporary and secure attachment of license tags and plates to a surface consisting of:
   a suction cup having a neck and a cup portion for attachment to the surface;
   a wire attached through the neck of the suction cup, such that the wire extends an equal distance on each side of the suction cup;
   a connecting portion on each end of the wire; and
   means for connecting each end of the wire to a tag or plate.

2. The holder of claim 1 wherein the connecting portion on each end of the wire comprises a hook.

3. The holder of claim 1 wherein the connecting portion on each end of the wire comprises a loop.

4. The holder of claim 1, 2 or, 3 wherein the means for connecting each end of the wire to a tag or plate comprises a bolt and nut combination at each end of the wire which is secured through holes in the tag or plate.

5. A holder for temporary and secure attachment of license tags and plates to a surface consisting of:
   two suction cups, each having a neck and a cup portion for attachment to the surface;
   a wire attached through the neck of each suction cup such that wire extends beyond each suction cup an equal distance with a downward bend near each end of the wire;
   a connecting portion on each end of the wire; and
   means for connecting each end of the wire to a plate or tag.

6. The holder of claim 5 wherein the connecting portion on each end of the wire comprises a hook.

7. The holder of claim 5 wherein the connecting portion on each end of the wire comprise a loop.

8. The holder of claim 5, 6 or 7 wherein the means for connecting each end of the wire to the plate comprises a bolt and nut combination at each end of the wire.

9. The holder of claim 1 or 5 wherein the wire is made of rigid plastic.

10. The holder of claim 1 or 5 wherein the wire is made of metal covered by a plastic sheaf.

11. The holder of claim 1 or 5 wherein the wire is made of metal covered by a vinyl.

12. The holder of claim 1 or 5 wherein the wire is made of metal covered by an epoxy.

* * * * *